United States Patent
Schaeffer

(10) Patent No.: US 12,541,479 B2
(45) Date of Patent: Feb. 3, 2026

(54) SINGLE-PORT AND DUAL-PORT EDSFF MEDIA PORT CONTROL

(71) Applicant: DELL PRODUCTS L.P., Round Rock, TX (US)

(72) Inventor: Tobias Schaeffer, Watertown, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/649,860

(22) Filed: Apr. 29, 2024

(65) Prior Publication Data

US 2025/0335386 A1   Oct. 30, 2025

(51) Int. Cl.
  *G06F 13/00* (2006.01)
  *G06F 13/40* (2006.01)
(52) U.S. Cl.
  CPC .. *G06F 13/4068* (2013.01); *G06F 2213/0026* (2013.01)
(58) Field of Classification Search
  CPC ................... G06F 13/4068; G06F 2213/0026

USPC ................. 710/305, 306, 316, 317
See application file for complete search history.

(56) References Cited

U.S. PATENT DOCUMENTS

| | | | |
|---|---|---|---|
| 2018/0246833 A1 | 8/2018 | Bai et al. | |
| 2020/0409885 A1* | 12/2020 | Denworth | G06F 13/4022 |
| 2022/0050800 A1* | 2/2022 | Kim | G06F 13/4022 |
| 2022/0319556 A1 | 10/2022 | Dong et al. | |
| 2023/0116254 A1* | 4/2023 | Benisty | G06F 3/0679 |
| | | | 711/154 |
| 2024/0184732 A1* | 6/2024 | Skirmont | G06F 13/4291 |
| 2024/0237219 A1* | 7/2024 | Umoh | H01R 12/57 |
| 2025/0165405 A1* | 5/2025 | Lee | G06F 12/121 |
| 2025/0173078 A1* | 5/2025 | Soltaniyeh | G06F 3/0604 |

* cited by examiner

*Primary Examiner* — Henry Tsai
*Assistant Examiner* — Kim T Huynh
(74) *Attorney, Agent, or Firm* — Larson Newman, LLP

(57) ABSTRACT

An information handling system includes Enterprise and Datacenter Standard Form Factor (EDSFF) devices. The system provides a mode enable signal to all of the EDSFF devices, and separate power enable signals to each one of the EDSFF devices.

18 Claims, 2 Drawing Sheets

SINGLE-PORT AND DUAL-PORT EDSFF MEDIA PORT CONTROL

FIELD OF THE DISCLOSURE

This disclosure generally relates to information handling systems, and more particularly relates to single-port and dual-port EDSFF media port control in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may provide a mode enable signal to Enterprise and Datacenter Standard Form Factor (EDSFF) devices, and a power enable signal to each one of the EDSFF devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
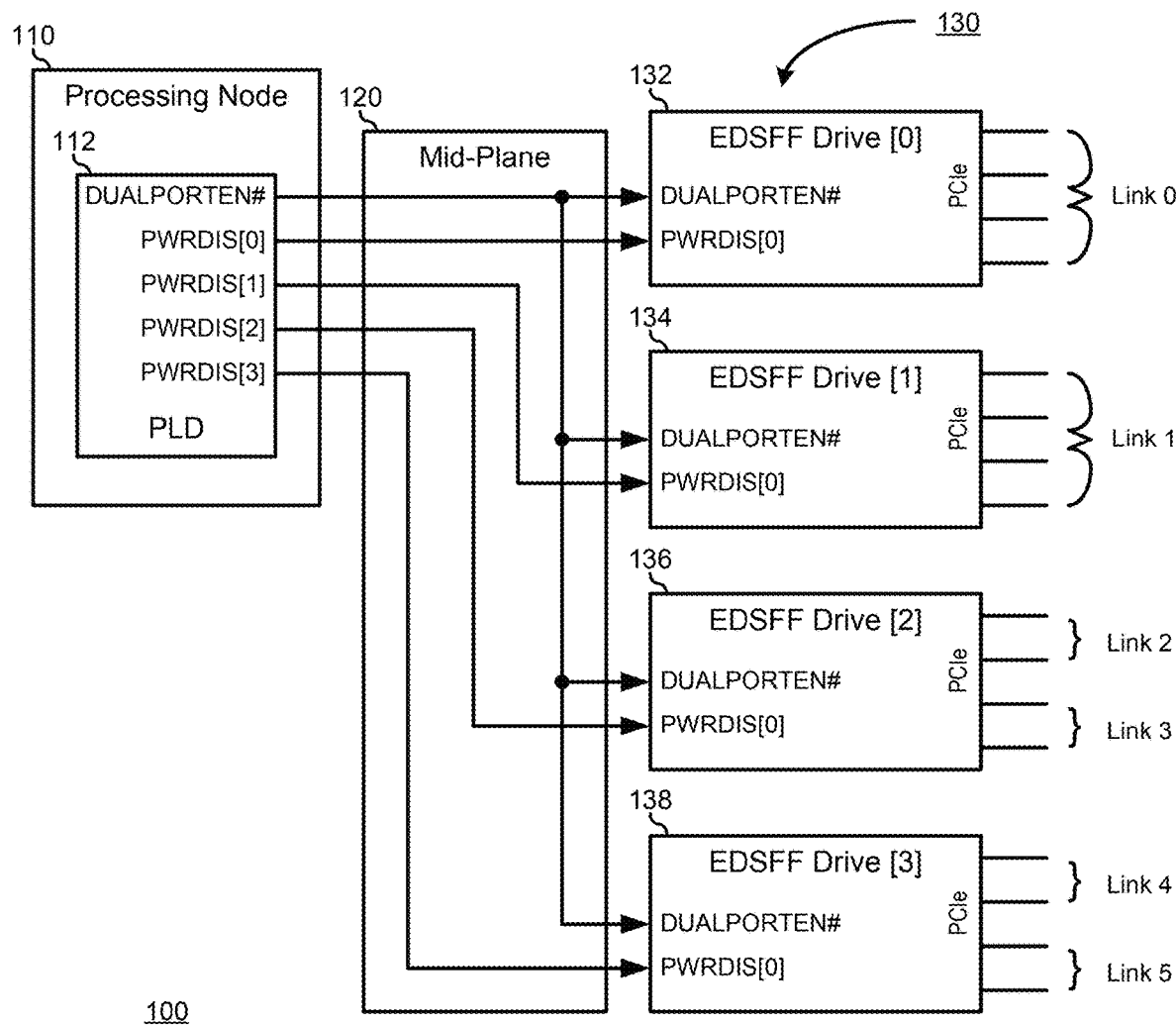
FIG. 1 is a block diagram illustrating an information handling system according to an embodiment of the present disclosure.
Figure 1:
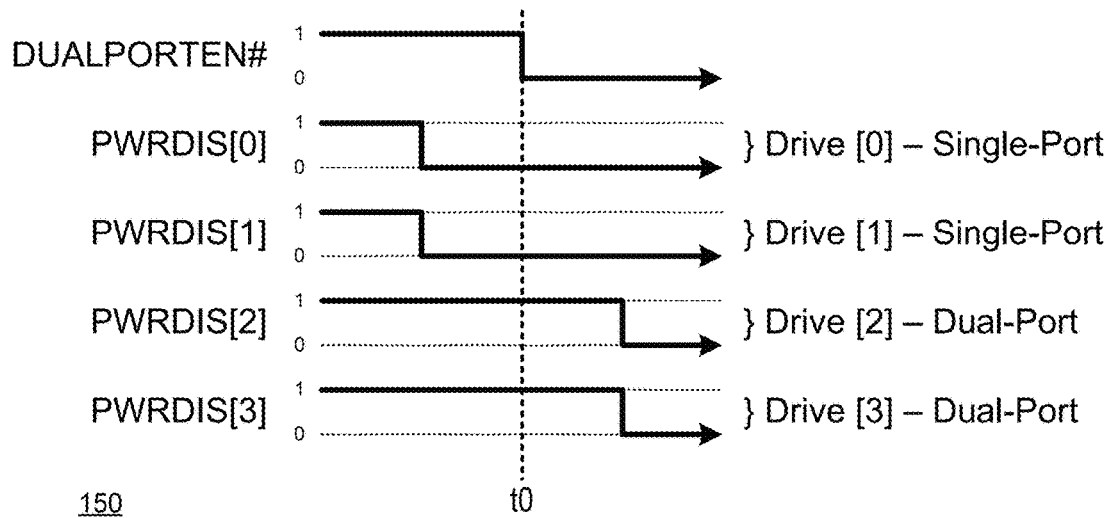
Figure 2:
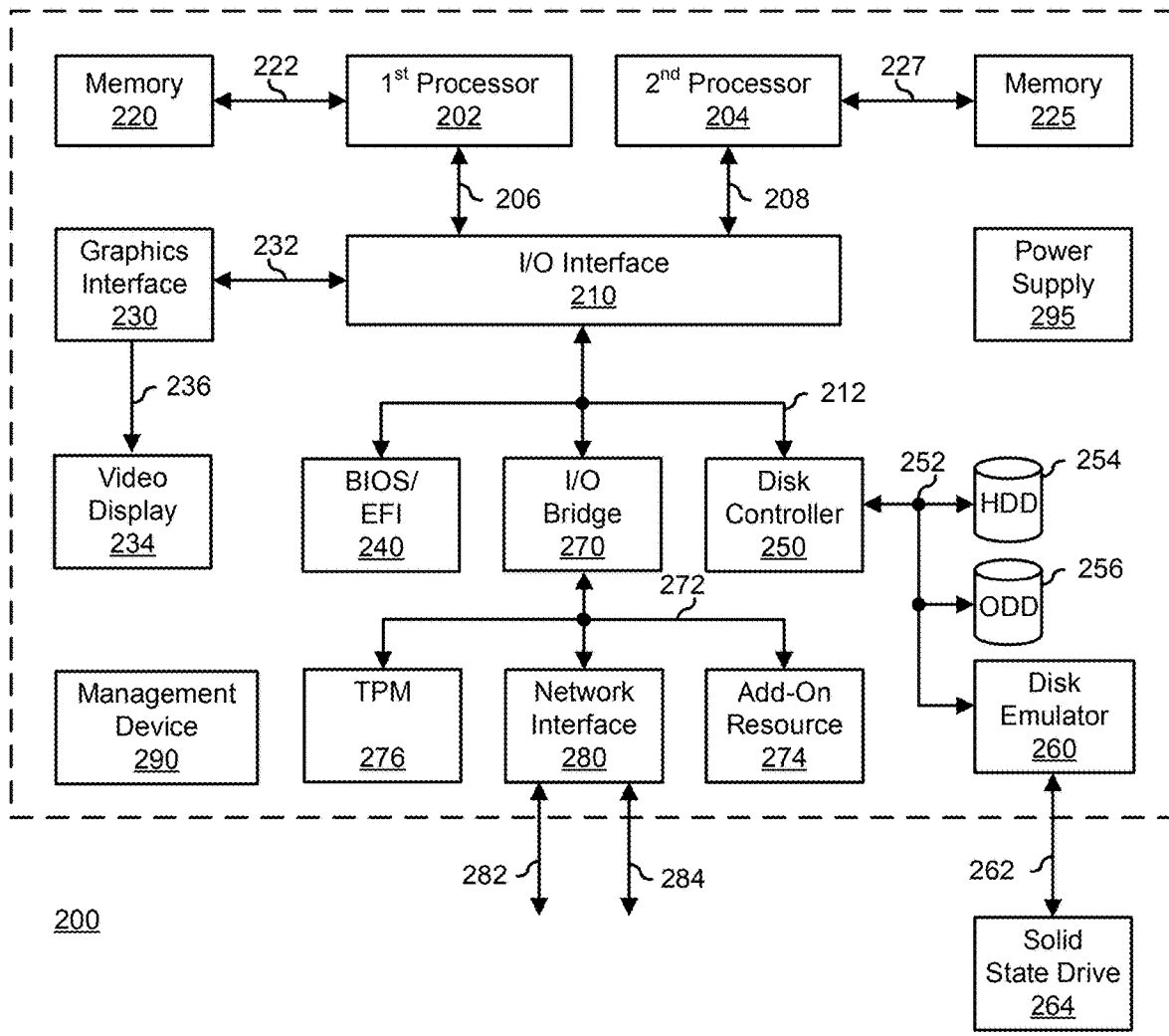
FIG. 2 is a block diagram illustrating a generalized information handling system according to another embodiment of the present disclosure.

FIG. 1 illustrates an information handling system 100 including a processing node 110, a connectivity mid-plane 120, and Enterprise and Datacenter Standard Form Factor (EDSFF) devices 130. Information handling system 100 may be similar to information handling system 200 as shown in FIG. 2 and described below. In particular, information handling system 100 represents an enterprise system as may be utilized in a data center or the like, where EDSFF devices 130 provide a high-availability (HA) storage solution to processing node 110 and one or more additional processing node (not illustrated), where each of the processing nodes shares the storage capacity of the EDSFF devices. Information handling system 100 is simplified to illustrate only processing node 110 for simplicity of illustration of the current embodiments. However the additional processing nodes shall be understood to be similar to processing node 110, and may share the storage capacity of EDSFF devices 130, and the teachings of the current disclosure may be readily extended to additional processing nodes as needed or desired.

In particular where processing node 110 is illustrated as providing control signaling to EDSFF devices 130, it should be understood that other processing nodes may share the control signaling to the EDSFF devices. A scheme to negotiate the ownership of the control signals will be understood to exist between the processing nodes. However, such ownership negotiation of control signals is beyond the scope of the current disclosure, and will not be further described herein, except as may be needed to illustrate the current embodiments.

EDSFF devices 130 include four (4) EDSFF drives 132, 134, 136, and 138. EDSFF drives 132, 134, 136, and 138 each communicate data with elements of information handling system 100 via four (4) Peripheral Component Interconnect-Express (PCIe) lanes. EDSFF drives 132, 134, 136, and 138 each represent either a single-port-only EDSFF drive, where the four (4) PCIe lanes are configured as a single four-lane (x4) PCIe link, as a dual-port-only EDSFF drive, where the four (4) PCIe lanes are configured as two (2) separate two-lane (x2) PCIe links, or a dual-port-capable EDSFF drive where the four (4) PCIe lanes are selectably configured as a single four-lane (x4) PCIe link or as two (2) separate two-lane (x2) PCIe links.

Single-port/dual-port selection is performed on dual-port-capable EDSFF drives through a sequence of control signals provided by the host information handling system. In particular, all varieties of EDSFF drives include a signal pin (PWRDIS) that, when asserted by the host information handling system, commands the EDSFF drive to shut off 12 V power to all circuitry of the EDSFF drive. In addition, EDSFF drives include an active-low signal input (DUALPORTEN#) that, the state of which, in combination with the de-assertion of the power disable signal (PWRDIS), operates to select whether a dual-port-capable EDSFF drive is operated as a single-port EDSFF drive, or as a dual-port EDSFF drive. When the dual-port-enable signal (DUALPORTEN#) is de-asserted (i.e., in the logic high "1" state) at the time that the power disable signal (PWRDIS) is de-asserted, the EDSFF drive operates as a single-port EDSFF drive. On the other hand, when the dual-port-enable signal (DUALPORTEN#) is asserted (i.e., in the logic low "0" state) at the time that the power disable signal (PWRDIS) is de-asserted, the EDSFF drive operates as a dual-port EDSFF drive.

In the typical host information handling system, EDSFF drives are preselected to operate either as single-port EDSFF drives, or as dual-port EDSF drives. That is, a host information handling system that is configured to operate EDSFF drives as single-port EDSFF drives will typically hard wire the dual-port-enable signal (DUALPORTEN#) to a ground plane to ensure that any dual-port-capable EDSFF drive is selected to operate as a single-port EDSFF drive. Likewise, a host information handling system that is configured to operate EDSFF drives as dual-port EDSFF drives will typically hard wire the dual-port-enable signal (DUAL-PORTEN#) to a high voltage (for example 12 V) plane to ensure that any dual-port-capable EDSFF drive is selected to operate as a dual-port EDSFF drive. Single-port-only EDSFF drives and dual-port-only EDSFF drives receive the dual-port-enable signal (DUALPORTEN#) input, but ignore the signal, and operate in their native capacity as respective single-port EDSFF drives or dual-port EDSFF drives regardless of the state of the signal.

It has been understood by the inventors of the current disclosure that there is a need to flexibly enable single-port operation or dual-port operation on a common information handling system in order to meet the changing demands within a processing environment. However, because the enabling of the dual-port operation of an EDSFF drive is predicated on the correct assertion of two separate control signals, viz., PWRDIS and DUALPORTEN#, utilizing the conventional approach of routing separate port enable signals (DUAPPORTEN#) to each EDSFF drive in an information handling system would necessitate a large increase in the pin counts and traces needed in the interconnections. For example, a typical server system may employ 44 EDSFF drives, or more. As such, a midplane would need at least 44 additional pins in a first connector between the host and the midplane, and the routing of the additional signals could necessitate added signal layers in the midplane printed circuit board (PCB). Another solution could be to add a logic device to the midplane to provide separate dual-port enable signals (DUALPORTEN#) for each EDSFF drive. However, both solutions wind up increasing the cost and decreasing the reliability of such a server.

Returning to FIG. 1, processing node 110 includes a programmable logic device 112 with a single (1) dual-port enable signal (DUALPORTEN#) and separate power disable signals (PWRDIS[0-3]) for each of EDSFF drives 132, 134, 136, and 138. Here, the single (1) dual-port enable signal (DUALPORTEN#) is routed to midplane 120 and from the midplane to the separate dual-port enable signal (DUALPORTEN#) inputs of each of EDSFF drives 132, 134, 136, and 138. A first power disable signal (PWRDIS[0]) is routed to midplane 120 and from the midplane to the power disable signal (PWRDIS[0]) input of EDSFF drive 132, a second power disable signal (PWRDIS[1]) is routed through the midplane to the power disable signal (PWRDIS [1]) input of EDSFF drive 134, a third power disable signal (PWRDIS[2]) is routed through the midplane to the power disable signal (PWRDIS[2]) input of EDSFF drive 136, and a fourth power disable signal (PWRDIS[3]) is routed through the midplane to the power disable signal (PWRDIS [3]) input of EDSFF drive 138.

In a particular embodiment, PLD 112 operates to determine whether or not to enable each of EDSFF drives 132, 134, 136, and 138 as either a single-port EDSFF drive or a dual-port EDSFF drive. The selection of single-port EDSFF drives and dual-port EDSFF drives may be provided by an operating system, a hypervisor, a virtual machine, or the like that is instantiated on information handling system 100. However such selection of single-port and dual-port EDSFF drives is beyond the scope of the current disclosure, and will not be further described herein, except as may be needed to illustrate the current embodiments. Once the determination is made as to which of EDSFF drives 132, 134, 136, and 138 are to be enabled as single-port EDSFF drives, and which are to be enabled as dual-port EDSFF drives is made, PLD 112 operates to alternately power up the single-port EDSFF drives and then power up the dual-port EDSFF drives, or vice versa.

FIG. 1 further illustrates the signal assertions 150 of the dual-port enable signal (DUALPORTEN#) and the various power disable signals (PWRDIS[0-3]) to first enable the single-port EDSFF drives (such as EDSFF drives 132, and 134), and then to enable the dual-port EDSFF drives (such as EDSFF drives 136 and 138). PLD de-asserts the dual-port enable signal (DUALPORTEN#), that is in the logic "1" state, to select for single-port enablement, and asserts the power disable signals (PWRDIS[0-3]), that is in the logic "1" state, to power down EDSFF drives 132, 134, 136, and 138. PLD 112 then de-asserts the power disable signals (PWRDIS[0-1]) to EDSFF drives 132 and 134, thereby powering up EDSFF drives 132 and 134 as single-port EDSFF drives.

After EDSFF drives 132 and 134 are powered up, at a time t0, PLD asserts the dual-port enable signal (DUAL-PORTEN#), that is in the logic "0" state, to select for dual-port enablement, and then de-asserts the power disable signals (PWRDIS[2-3]) to EDSFF drives 136 and 138, thereby powering up EDSFF drives 136 and 138 as dual-port EDSFF drives. As a result of this process, EDSFF drive 132 provides a x4 PCIe link (Link 0), EDSFF drive 134 provides a x4 PCIe link (Link 1), EDSFF drive 136 provides two (2) x2 PCIe links (Link 2 and Link 3), and EDSFF drive 138 provides two (2) x2 PCIe links (Lin4 2 and Link 5). A process may be provided where dual-port EDSFF drives are powered on and enabled first, and then single-port EDSFF drives are powered on and enabled second, as needed or desired.

In this way, both single-port EDSFF drives and dual-port EDSFF drives can co-exist in the same information handling system. Moreover, even after an initial set-up of single-port EDSFF drives and dual-port EDSFF drives, information handling system 100 may operate to change the port enablement for one or more of EDSFF drives 132, 134, 136, and 138, as needed or desired. For example if at a later time it is desired that EDSFF drive 132 be reconfigured as a dual-port EDSFF drive, PLD 112 will operate to assert the power disable signal (PWRDIS[0]) for EDSFF drive 132, thereby powering down only EDSFF drive 132. PLD 112 then operates to assert the dual-port enable signal (DUAL-PORTEN#) to select for dual-port enablement, and de-asserts the power disable signal (PWRDIS[0]) to EDSFF drive 132, thereby powering up only EDSFF drive 132 as a dual-port EDSFF drive. Such flexibility in dynamically allocating single-port EDSFF drives and dual-port EDSFF drives in a common information handling system is enabled by ganging the dual-port enable signal (DUALPORTEN#) to all EDSFF drives in the information handling system, rather than by tying the dual-port enable signal (DUAL-PORTEN#) to either a power rail or to a ground plane, as is done in the typical information handling system. Moreover the current embodiments necessitate no active logic on a midplane, nor are any new single-points-of-failure introduced into the information handling system.

FIG. 2 illustrates a generalized embodiment of an information handling system 200 similar to information handling system 200. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 200 can include processing resources for executing machine-executable code, such as a central processing unit (CPU), a programmable logic array (PLA), an embedded device such as a System-on-a-Chip (SoC), or other control logic hardware. Information handling system 200 can also include one or more computer-readable medium for storing machine-executable code, such as software or data. Additional components of information handling system 200 can include one or more storage devices that can store machine-executable code, one or more communications ports for communicating with external devices, and various input and output (I/O) devices, such as a keyboard, a mouse, and a video display. Information handling system 200 can also include one or more buses operable to transmit information between the various hardware components.

Information handling system 200 can include devices or modules that embody one or more of the devices or modules described below, and operates to perform one or more of the methods described below. Information handling system 200 includes a processors 202 and 204, an input/output (I/O) interface 210, memories 220 and 225, a graphics interface 230, a basic input and output system/universal extensible firmware interface (BIOS/UEFI) module 240, a disk controller 250, a hard disk drive (HDD) 254, an optical disk drive (ODD) 256, a disk emulator 260 connected to an external solid state drive (SSD) 262, an I/O bridge 270, one or more add-on resources 274, a trusted platform module (TPM) 276, a network interface 280, a management device 290, and a power supply 295. Processors 202 and 204, I/O interface 210, memory 220, graphics interface 230, BIOS/UEFI module 240, disk controller 250, HDD 254, ODD 256, disk emulator 260, SSD 262, I/O bridge 270, add-on resources 274, TPM 276, and network interface 280 operate together to provide a host environment of information handling system 200 that operates to provide the data processing functionality of the information handling system. The host environment operates to execute machine-executable code, including platform BIOS/UEFI code, device firmware, operating system code, applications, programs, and the like, to perform the data processing tasks associated with information handling system 200.

In the host environment, processor 202 is connected to I/O interface 210 via processor interface 206, and processor 204 is connected to the I/O interface via processor interface 208. Memory 220 is connected to processor 202 via a memory interface 222. Memory 225 is connected to processor 204 via a memory interface 227. Graphics interface 230 is connected to I/O interface 210 via a graphics interface 232, and provides a video display output 236 to a video display 234. In a particular embodiment, information handling system 200 includes separate memories that are dedicated to each of processors 202 and 204 via separate memory interfaces. An example of memories 220 and 230 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 240, disk controller 250, and I/O bridge 270 are connected to I/O interface 210 via an I/O channel 212. An example of I/O channel 212 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 210 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 240 includes BIOS/UEFI code operable to detect resources within information handling system 200, to provide drivers for the resources, initialize the resources, and access the resources. BIOS/UEFI module 240 includes code that operates to detect resources within information handling system 200, to provide drivers for the resources, to initialize the resources, and to access the resources.

Disk controller 250 includes a disk interface 252 that connects the disk controller to HDD 254, to ODD 256, and to disk emulator 260. An example of disk interface 252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 260 permits SSD 264 to be connected to information handling system 200 via an external interface 262. An example of external interface 262 includes a USB interface, an IEEE 1394 (Firewire) interface, a proprietary interface, or a combination thereof. Alternatively, solid-state drive 264 can be disposed within information handling system 200.

I/O bridge 270 includes a peripheral interface 272 that connects the I/O bridge to add-on resource 274, to TPM 276, and to network interface 280. Peripheral interface 272 can be the same type of interface as I/O channel 212, or can be a different type of interface. As such, I/O bridge 270 extends the capacity of I/O channel 212 where peripheral interface 272 and the I/O channel are of the same type, and the I/O bridge translates information from a format suitable to the I/O channel to a format suitable to the peripheral channel 272 where they are of a different type. Add-on resource 274 can include a data storage system, an additional graphics interface, a network interface card (NIC), a sound/video processing card, another add-on resource, or a combination thereof. Add-on resource 274 can be on a main circuit board, on separate circuit board or add-in card disposed within information handling system 200, a device that is external to the information handling system, or a combination thereof.

Network interface 280 represents a NIC disposed within information handling system 200, on a main circuit board of the information handling system, integrated onto another component such as I/O interface 210, in another suitable location, or a combination thereof. Network interface device 280 includes network channels 282 and 284 that provide interfaces to devices that are external to information handling system 200. In a particular embodiment, network channels 282 and 284 are of a different type than peripheral channel 272 and network interface 280 translates information from a format suitable to the peripheral channel to a format suitable to external devices. An example of network channels 282 and 284 includes InfiniBand channels, Fibre Channel channels, Gigabit Ethernet channels, proprietary channel architectures, or a combination thereof. Network channels 282 and 284 can be connected to external network resources (not illustrated). The network resource can include another information handling system, a data storage system, another network, a grid management system, another suitable resource, or a combination thereof.

Management device 290 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 200. In particular, management device 290 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 200, such as system cooling fans and power supplies. Management device 290 can include a network connection to an external management system, and the management device can communicate with the management system to report status information for information handling system 200, to receive BIOS/UEFI or system firmware updates, or to perform other task for managing and controlling the operation of information handling system 200. Management device 290 can operate off of a separate power plane from the components of the host environment so that the management device receives power to manage information handling system 200 where the information handling system is otherwise shut down. An example of management device 290 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 290 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a plurality of Enterprise and Datacenter Standard Form Factor (EDSFF) devices; and
   a processor configured to provide a single (1) mode enable signal to all of the EDSFF devices, and to provide multiple power enable signals, one power enable signal being provided to each of the EDSFF devices, wherein a first state of the mode enable signal is associated with an EDSFF device single-port enablement, and a second state of the mode enable signal is associated with an EDSFF device dual-port enablement.

2. The information handling system of claim 1, wherein the processor is further configured to determine that a first set of the EDSFF devices are to be enabled with the single-port enablement.

3. The information handling system of claim 2, wherein the processor is further configured to set the mode enable signal to the first state in response to determining that the first set of the EDSFF devices are to be enabled with the single-port enablement.

4. The information handling system of claim 3, wherein the processor is further configured to set the power enable signals associated with the first set of EDSFF devices to power on the first set of EDSFF devices.

5. The information handling system of claim 4, wherein the processor is further configured to determine that a second set of the EDSFF devices are to be enabled with the dual-port enablement.

6. The information handling system of claim 5, wherein the processor is further configured to set the mode enable signal to the second state in response to determining that the second set of the EDSFF devices are to be enabled with the dual-port enablement.

7. The information handling system of claim 6, wherein the processor is further configured to set the power enable signals associated with the second set of EDSFF devices to power on the second set of EDSFF devices.

8. The information handling system of claim 1, wherein the single-port enablement is operable to configure the EDSFF devices to provide a four-lane (x4) Peripheral Component Interconnect-Express (PCIe) link.

9. The information handling system of claim 8, wherein the dual-port enablement is operable to configure the EDSFF devices to provide two (2) two-lane (x2) PCIe links.

10. A method, comprising:
    providing, on an information handling system, a plurality of Enterprise and Datacenter Standard Form Factor (EDSFF) devices;
    providing a single (1) mode enable signal to all of the EDSFF devices, wherein a first state of the mode enable signal is associated with an EDSFF device single-port enablement, and a second state of the mode enable signal is associated with an EDSFF device dual-port enablement; and
    providing multiple power enable signals, one power enable signal being provided to each one of the EDSFF devices.

11. The method of claim 10, further comprising determining that a first set of the EDSFF devices are to be enabled with the single-port enablement.

12. The method of claim 11, further comprising setting the mode enable signal to the first state in response to determining that the first set of the EDSFF devices are to be enabled with the single-port enablement.

13. The method of claim 12, further comprising setting the power enable signals associated with the first set of EDSFF devices to power on the first set of EDSFF devices.

14. The method of claim 13, further comprising determining that a second set of the EDSFF devices are to be enabled with the dual-port enablement.

15. The method of claim 14, further comprising setting the mode enable signal to the second state in response to determining that the second set of the EDSFF devices are to be enabled with the dual-port enablement.

16. The method of claim 15, further comprising setting the power enable signals associated with the second set of EDSFF devices to power on the second set of EDSFF devices.

17. The method of claim 10, wherein the single-port enablement is operable to configure the EDSFF devices to provide a four-lane (x4) Peripheral Component Interconnect-Express (PCIe) link, and the dual-port enablement is operable to configure the EDSFF devices to provide two (2) two-lane (x2) PCIe links.

18. An information handling system, comprising:
a plurality of Enterprise and Datacenter Standard Form Factor (EDSFF) devices; and
a processor configured to provide a single (1) mode enable signal to all of the EDSFF devices, and to provide multiple power enable signals, one power enable signal being provided to each one of the EDSFF devices;
wherein a first state of the mode enable signal is associated with an EDSFF device single-port enablement, and a second state of the mode enable signal is associated with an EDSFF device dual-port enablement, the single-port enablement being operable to configure the EDSFF devices to provide a four-lane (x4) Peripheral Component Interconnect-Express (PCIe) link, and the dual-port enablement being operable to configure the EDSFF devices to provide two (2) two-lane (x2) PCIe links.

* * * * *